(12) United States Patent
Yamazaki

(10) Patent No.: US 12,093,831 B2
(45) Date of Patent: Sep. 17, 2024

(54) IMAGE PROCESSING APPARATUS, NEURAL NETWORK TRAINING METHOD, AND IMAGE PROCESSING METHOD

(71) Applicant: CANON KABUSHIKI KAISHA, Tokyo (JP)

(72) Inventor: Fukashi Yamazaki, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 328 days.

(21) Appl. No.: 17/330,723

(22) Filed: May 26, 2021

(65) Prior Publication Data

US 2021/0374462 A1 Dec. 2, 2021

(30) Foreign Application Priority Data

May 28, 2020 (JP) ................. 2020-093607

(51) Int. Cl.
*G06N 3/084* (2023.01)
*G06F 18/214* (2023.01)
(Continued)

(52) U.S. Cl.
CPC ........... *G06N 3/084* (2013.01); *G06F 18/214* (2023.01); *G06F 18/2431* (2023.01);
(Continued)

(58) Field of Classification Search
CPC .......... G06N 3/084; G06N 3/045; G06N 3/08; G06N 3/048; G06F 18/214; G06F 18/2431; G06F 18/24133; G06F 18/24; G06F 18/217; G06F 18/254; G06F 16/55; G06F 18/211; G06F 18/2413; G06F 18/2415; G06V 10/454; G06V 10/82; G06V 10/764; G06V 2201/03; G06V 10/774; G06V 10/25; G06V 20/64; G06V 10/26; G06V 10/776;
(Continued)

(56) References Cited

U.S. PATENT DOCUMENTS 7,680,307 B2 * 3/2010 Sathyanarayana .... G06F 18/254
382/128
10,223,610 B1 * 3/2019 Akselrod-Ballin ..... G06T 7/174
(Continued)

OTHER PUBLICATIONS

He, K., et al., "Delving Deep into Rectifiers: Surpassing Human-Level Performance on ImageNet Classification," Computer Vision Foundation, ICCV, 2015, pp. 1026-1034.
(Continued)

*Primary Examiner* — Michael S Osinski
(74) *Attorney, Agent, or Firm* — Venable LLP

(57) ABSTRACT

An image processing apparatus includes an acquisition unit configured to acquire an image, and a classification unit configured to perform inference on the image by using a neural network and to output a classification result, wherein the neural network includes a common network that is common to a plurality of classes and is configured to extract a first feature from an input image, and a plurality of single-class networks each of which corresponds to a corresponding one of the plurality of classes and is configured to extract each of a plurality of second features based on the first feature. Each of the plurality of single-class networks has a single-class output layer that classifies the corresponding class.

9 Claims, 10 Drawing Sheets

(51) Int. Cl.
*G06F 18/2431* (2023.01)
*G06N 3/045* (2023.01)
*G06N 3/08* (2023.01)
*G06V 10/44* (2022.01)
*G06V 10/82* (2022.01)

(52) U.S. Cl.
CPC .......... *G06N 3/045* (2023.01); *G06N 3/08* (2013.01); *G06V 10/454* (2022.01); *G06V 10/82* (2022.01)

(58) Field of Classification Search
CPC .......... G06V 10/809; G06V 10/255; G06V 10/7715; G06T 2207/20084; G06T 2207/20081; G06T 7/11
See application file for complete search history.

(56) References Cited

U.S. PATENT DOCUMENTS

| | | | | |
|---|---|---|---|---|
| 10,255,522 | B2* | 4/2019 | Pinheiro | G06V 10/764 |
| 10,366,302 | B2* | 7/2019 | Yang | G06V 10/82 |
| 10,504,027 | B1* | 12/2019 | Kim | G06N 3/045 |
| 10,540,572 | B1* | 1/2020 | Kim | G06T 5/50 |
| 10,607,135 | B2* | 3/2020 | Zhang | G06N 3/045 |
| 11,037,029 | B2* | 6/2021 | Jiang | G06V 10/82 |
| 11,244,191 | B2* | 2/2022 | Yao | G06V 10/7715 |
| 11,270,169 | B2* | 3/2022 | Sun | G06F 18/254 |
| 11,373,095 | B2* | 6/2022 | Barkan | G06F 16/532 |
| 11,417,000 | B2* | 8/2022 | Yamazaki | G06F 18/254 |
| 11,537,823 | B2* | 12/2022 | Ida | G06F 18/2415 |
| 11,562,171 | B2* | 1/2023 | Richards | G06V 10/82 |
| 11,645,869 | B2* | 5/2023 | El-Khamy | G06V 40/161 382/118 |
| 11,715,011 | B2* | 8/2023 | Yoo | G06N 3/045 382/156 |
| 11,741,354 | B2* | 8/2023 | Hotson | G06N 3/08 706/25 |
| 11,748,785 | B2* | 9/2023 | Lohumi | G06V 10/82 382/156 |
| 11,885,907 | B2* | 1/2024 | Popov | G01S 13/5242 |
| 2016/0217198 | A1* | 7/2016 | Lee | G06V 40/16 |
| 2017/0046613 | A1* | 2/2017 | Paluri | G06N 3/045 |
| 2017/0364771 | A1* | 12/2017 | Pinheiro | G06N 3/084 |
| 2018/0012107 | A1* | 1/2018 | Xu | G06F 18/2414 |
| 2018/0373953 | A1* | 12/2018 | Tomotaki | G06T 7/0002 |
| 2019/0005684 | A1* | 1/2019 | De Fauw | G06T 11/003 |
| 2019/0065817 | A1* | 2/2019 | Mesmakhosroshahi | G06V 20/698 |
| 2019/0065944 | A1* | 2/2019 | Hotson | G06N 3/044 |
| 2019/0164290 | A1* | 5/2019 | Wang | G06N 3/08 |
| 2019/0228268 | A1* | 7/2019 | Zhang | G06V 10/82 |
| 2019/0287264 | A1* | 9/2019 | Chalamala | G06V 10/82 |
| 2019/0385024 | A1* | 12/2019 | Croxford | G06N 3/08 |
| 2020/0026956 | A1* | 1/2020 | Kumar | G06F 18/2431 |
| 2020/0126190 | A1* | 4/2020 | Lebel | G06V 30/19173 |
| 2020/0160124 | A1* | 5/2020 | Fu | G06V 10/764 |
| 2020/0202103 | A1* | 6/2020 | Tang | G06F 18/00 |
| 2020/0218938 | A1* | 7/2020 | Stolikj | G06V 40/172 |
| 2020/0320769 | A1* | 10/2020 | Chen | G06F 18/214 |
| 2020/0394458 | A1* | 12/2020 | Yu | G06V 10/82 |
| 2021/0019531 | A1* | 1/2021 | Long | G06V 10/764 |
| 2021/0073267 | A1* | 3/2021 | Chopra | G06N 3/04 |
| 2021/0103771 | A1* | 4/2021 | Aides | G06V 10/764 |
| 2021/0124993 | A1* | 4/2021 | Singh | G06V 10/7715 |
| 2021/0158511 | A1* | 5/2021 | Guo | G06T 7/12 |
| 2021/0295523 | A1* | 9/2021 | Yamazaki | G06V 20/64 |
| 2021/0303986 | A1* | 9/2021 | Saha | G06F 16/285 |
| 2021/0377554 | A1* | 12/2021 | Kim | H04N 19/136 |
| 2021/0406596 | A1* | 12/2021 | Hoffman | G06V 10/82 |
| 2022/0083868 | A1* | 3/2022 | Zhou | G06N 3/045 |
| 2022/0092351 | A1* | 3/2022 | Huang | G06V 10/95 |
| 2022/0148291 | A1* | 5/2022 | Huang | G06V 10/82 |
| 2022/0148300 | A1* | 5/2022 | Yamamoto | G06V 10/96 |
| 2022/0165053 | A1* | 5/2022 | Wu | G06N 3/045 |
| 2023/0010160 | A1* | 1/2023 | Chen | G06V 10/80 |
| 2023/0038364 | A1* | 2/2023 | Bhowmick | G06N 3/045 |
| 2023/0061517 | A1* | 3/2023 | Yang | G06V 20/80 |
| 2023/0093630 | A1* | 3/2023 | Schnitzler | G06N 3/045 |
| 2024/0037747 | A1* | 2/2024 | Raedt | G06V 20/698 |

OTHER PUBLICATIONS

Long, J., et al., "Fully Convolutional Networks for Semantic Segmentation", Computer Vision Foundation, CVPR, 2015, pp. 3431-3440.

Office Action issued on Jan. 23, 2024, in corresponding Japanese Patent Application No. 2020-093607 (with English translation, 11 pages).

* cited by examiner

IMAGE PROCESSING APPARATUS, NEURAL NETWORK TRAINING METHOD, AND IMAGE PROCESSING METHOD

CROSS-REFERENCE TO PRIORITY APPLICATION

This application claims the benefit of Japanese Patent Application No. 2020-093607, filed on May 28, 2020, which is hereby incorporated by reference herein in its entirety.

BACKGROUND OF THE INVENTION

Field of the Invention

The disclosure of the present specification relates to an image processing apparatus, a neural network training method, and an image processing method.

Description of the Related Art

Classifiers based on deep learning have recently attracted attention in the field of image processing. Among these, a method called supervised learning is employed to learn classifiers by using training data that includes a training image and ground truth data. The training image is an image obtained by capturing an image of a target object that exists in the real space by an imaging apparatus, and the image of the target object is rendered in the training image. The ground truth data is data provided to correspond to the training image. For example, in segmentation, the ground truth data is an image, in which a ground truth region is drawn, and indicates a location where the target object is rendered in the corresponding training image. When there are a plurality of target objects, a plurality of ground truth data corresponding to classes each of which represents a corresponding one of the target objects is used.

"Fully Convolutional Networks for Semantic Segmentation", CVPR, 2015 by Jonathan Long, et al. discloses a technique for constructing a classifier that simultaneously performs segmentation to extract regions of a plurality of target objects by using training data including a training image and a plurality of ground truth data corresponding to classes each of which represents a corresponding one of the target objects.

The technique disclosed by Long, et al. is unable to use training data for training if the training data includes missing ground truth data corresponding to at least one of the classes each of which represents a corresponding one of the plurality of target objects. This issue is not limited to the classifiers that perform segmentation but occurs in general in the methods that belong to the supervised training.

SUMMARY OF THE INVENTION

An object of the present disclosure is to provide a technique that makes training data usable for training even when the training data includes missing ground truth data corresponding to at least one of the classes each of which represents a corresponding one of the plurality of target objects.

The first aspect of the disclosure is a neural network comprising a common network that is common to a plurality of classes and configured to extract a first feature from an input image, and a plurality of single-class networks, each of which corresponds to a corresponding one of the plurality of classes and is configured to extract each of a plurality of second features based on the first feature, and wherein each of the plurality of single-class networks has a single-class output layer that classifies the corresponding class.

The second aspect of the disclosure is an image processing apparatus comprising an acquisition unit configured to acquire an image, and a classification unit configured to perform inference on the image by using a neural network and to output a classification result, wherein the neural network includes a common network that is common to a plurality of classes and configured to extract a first feature from an input image, and a plurality of single-class networks, each of which corresponds to a corresponding one of the plurality of classes and is configured to extract each of a plurality of second features based on the first feature, and wherein each of the plurality of single-class networks has a single-class output layer that classifies the corresponding class.

The third aspect of the disclosure is a neural network training method that is a computer-implemented method for training a neural network that includes a common network that is common to a plurality of classes and a plurality of single-class networks that are connected to the common network and each of which has a single-class output layer for individually classifying each of the plurality of classes, the neural network training method comprising an acquisition step of acquiring training data that includes ground truth data corresponding to at least one of the plurality of classes, and a training step of training the neural network by using the training data, wherein, when training is performed by using training data that includes missing ground truth data corresponding to at least one of the plurality of classes, the training step trains a single-class network corresponding to a class of which ground truth data is not missing and does not train the single-class network corresponding to the class of which ground truth data is missing.

The fourth aspect of the disclosure is an image processing method comprising an acquisition step of acquiring an image; and an inference step performing inference on the image by using a neural network to output a classification result, wherein the neural network includes, a common network that is common to a plurality of classes and configured to extract a first feature from an input image, and a plurality of single-class networks, each of which corresponds to a corresponding one of the plurality of classes and is configured to extract each of a plurality of second features based on the first feature, and wherein each of the plurality of single-class networks has a single-class output layer that classifies the corresponding class.

The fifth aspect of the disclosure is an image processing apparatus training a neural network including a common network that is common to a plurality of classes and a plurality of single-class networks that is connected to the common network and each of which includes a single-class output layer for individually classifying each of the plurality of classes, the image processing apparatus comprising an acquisition unit that acquires training data including ground truth data corresponding to at least one of the plurality of classes and a training unit that trains the neural network by using the training data, wherein, when training is performed by using training data that includes missing ground truth data corresponding to at least one of the plurality of classes, the training unit trains a single-class network corresponding to a class of which ground truth data is not missing and does not train a single-class network corresponding to a class of which ground truth data is missing.

According to the present disclosure, provided is a technique that makes training data usable for training even when the training data includes missing ground truth data corresponding to at least one of the classes each of which represents a corresponding one of the plurality of target objects.

Further features of the present invention will become apparent from the following description of exemplary embodiments with reference to the attached drawings.

DESCRIPTION OF THE EMBODIMENTS

Figure 1:
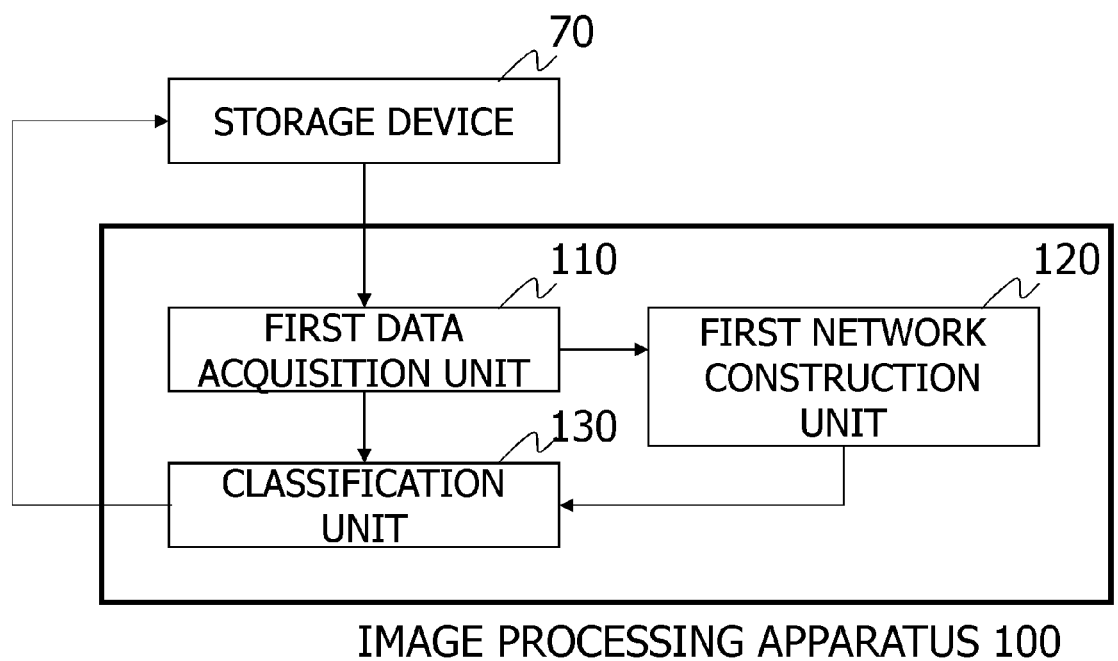
FIG. 1 illustrates an example of a functional configuration of an image processing apparatus 100 according to a first embodiment.

Hereafter, preferred embodiments of an image processing apparatus disclosed in the present description will be described with reference to the drawings. The same or similar components, members, and processes illustrated in each drawing are denoted by the same reference numerals, and redundant descriptions thereof will be omitted as appropriate. Some of the components, members, and processes may be omitted as appropriate from each drawing.

Hereafter, a technique disclosed in the present description will be described by using a CNN (convolutional neural network), which is a type of neural network, as an example of a classifier based on deep training.

First Embodiment

<Outline> The present embodiment will be described by using a CNN that performs segmentation to extract organ regions from an abdominal CT image (three-dimensional tomographic image) captured by an X-ray computed tomography (X-ray CT) apparatus as an example. Segmentation target organs (target objects) are a liver, kidneys, and a gallbladder.

In the present embodiment, an inference process is performed by an image processing apparatus 100, and a training process is performed by an image processing apparatus 500.

The image processing apparatus 100 performs segmentation to extract a liver region, a kidney region, and a gallbladder region from an abdominal CT image by using a CNN, which is an aspect of the disclosure disclosed in the present description. First, the image processing apparatus 100 constructs a CNN based on parameters obtained by training. The CNN used in the present embodiment belongs to a 2D-CNN that receives a two-dimensional image as input and outputs a classification result for the two-dimensional image. The CNN is constructed by connecting a network corresponding to a liver, a network corresponding to kidneys, and a network corresponding to a gallbladder (examples of a single-class network) to a network common to the liver, the kidneys, and the gallbladder (an example of a common network). More commonly, the CNN includes a common network that is common to all classes and a plurality of single-class networks, each of which corresponds to a corresponding one of the plurality of classes, and these networks are connected such that output of the common network is input to each of the single-class networks. Next, the image processing apparatus 100 acquires an abdominal computed tomography (CT) image to be a target of the segmentation processing and sequentially inputs a plurality of two-dimensional tomographic images constituting the abdominal CT image to the CNN. After receiving the two-dimensional tomographic images as input, the CNN performs forward propagation and outputs the classification results for the two-dimensional tomographic images to the image processing apparatus 100. The image processing apparatus 100 obtains a classification result for the abdominal CT image by processing all the two-dimensional tomographic images by using the CNN. The classification results obtained by the CNN are the segmentation results representing the respective regions of the liver, the kidneys, and the gallbladder.

The image processing apparatus 500 generates parameters for the CNN to be used by the image processing apparatus 100. First, the image processing apparatus 500 constructs a CNN equivalent to the CNN used by the image processing apparatus 100. Parameters of the networks included in the CNN are initialized by using a predetermined method. Next, the image processing apparatus 500 acquires training data. The training data includes an abdominal CT image, which is a training image, and ground truth data, which is provided to correspond to the training image. The ground truth data is an image (a ground truth image) in which a ground truth region is drawn and indicates a location where a target object is rendered in the corresponding training image. In this embodiment, an image in which the correct region of the liver is drawn (a ground truth image of the liver), an image in which the correct region of the kidneys is drawn (a ground truth image of the kidneys), and an image in which the correct region of the gallbladder is drawn (a ground truth image of the gallbladder) are the ground truth data. In this embodiment, each training data includes at least one of the ground truth images, which are the ground truth image of the liver, the ground truth image of the kidneys, and the ground truth image of the gallbladder. The image processing apparatus 500 trains the CNN by using the acquired training data. When the training data includes the ground truth image of the liver, the parameters of the common network and the network corresponding to the liver are updated in the training of the CNN according to the present disclosure. Likewise, when the training data includes the ground truth image of the kidneys or the ground truth image of the gallbladder, the parameters of the common network and the network of the corresponding organ, which constitute the CNN, are updated. As described above, when the training is performed by using the training data that includes missing ground truth data corresponding to at least one class, the image processing apparatus 500 trains (updates parameter of) the single-class network corresponding to the class whose ground truth data is not missing. In contrast, the image processing apparatus 500 does not learn the single-class network corresponding to the class whose ground truth data is missing. The image processing apparatus 500 may learn the common network, irrespective of whether the training data has any missing ground truth data. With the configuration described above, the CNN according to the present disclosure can utilize training data for training even when the training data includes missing ground truth data corresponding to at least one of the classes each of which represents a corresponding one of the plurality of target objects.

In the present description, a process for segmenting organ regions from an abdominal CT image, which is a processing target, by the image processing apparatus 100 is called an inference process, and a process for training the CNN by the image processing apparatus 500 is called a training process. In the present embodiment, while the inference process and the training process are performed by the image processing apparatus 100 and the image processing apparatus 500, respectively, both the inference process and the training process may be performed by a single image processing apparatus.

Hereafter, the training data that includes ground truth data corresponding to all the classes, each of which represents a corresponding one of the plurality of target objects, will be referred to as complete training data. The training data that includes missing ground truth data corresponding to at least one of the classes, each of which represents a corresponding one of the plurality of target objects will be referred to as incomplete training data. In addition, the parameters of the network will simply be referred to as parameters.

<Inference Process> First, a configuration of the image processing apparatus 100 according to the present embodiment will be described.

(Functional Configuration) A functional configuration of the image processing apparatus 100 according to the present embodiment will be described with reference to FIG. 1. As illustrated in FIG. 1, the image processing apparatus 100 includes a first data acquisition unit 110, a first network construction unit 120, and a classification unit 130. Further, the image processing apparatus 100 according to the present embodiment is communicatively connected to an external storage device 70.

The storage device 70 is an example of a computer-readable storage medium that is a large-capacity information storage device typified by a hard disk drive (HDD) and a solid-state drive (SSD). The storage device 70 holds at least one abdominal CT image to be processed and parameters of the CNN in the classification unit 130.

The first data acquisition unit 110 acquires the parameters of the CNN in the classification unit 130 from the storage device 70. The first data acquisition unit 110 then transmits the acquired parameters of the CNN to the first network construction unit 120. The first data acquisition unit 110 also acquires the abdominal CT image to be processed as an input image from the storage device 70. The first data acquisition unit 110 then transmits the acquired input image to the classification unit 130.

The first network construction unit 120 receives the parameters of the CNN from the first data acquisition unit 110. Next, the first network construction unit 120 constructs the CNN based on the parameters of the CNN. The configuration of the CNN will be described below. The first network construction unit 120 then transmits the constructed CNN to the classification unit 130.

The classification unit 130 receives the input image from the first data acquisition unit 110 and receives the CNN from the first network construction unit 120. The classification unit 130 then inputs the input image to the CNN and obtains segmentation results.

At least a part of the units of the image processing apparatus 100 illustrated in FIG. 1 may be implemented as an independent apparatus. In addition, each unit of the image processing apparatus 100 may be implemented as software that executes a corresponding function or may be implemented by dedicated hardware. In the present embodiment, each unit is implemented by corresponding software.

Figure 2:
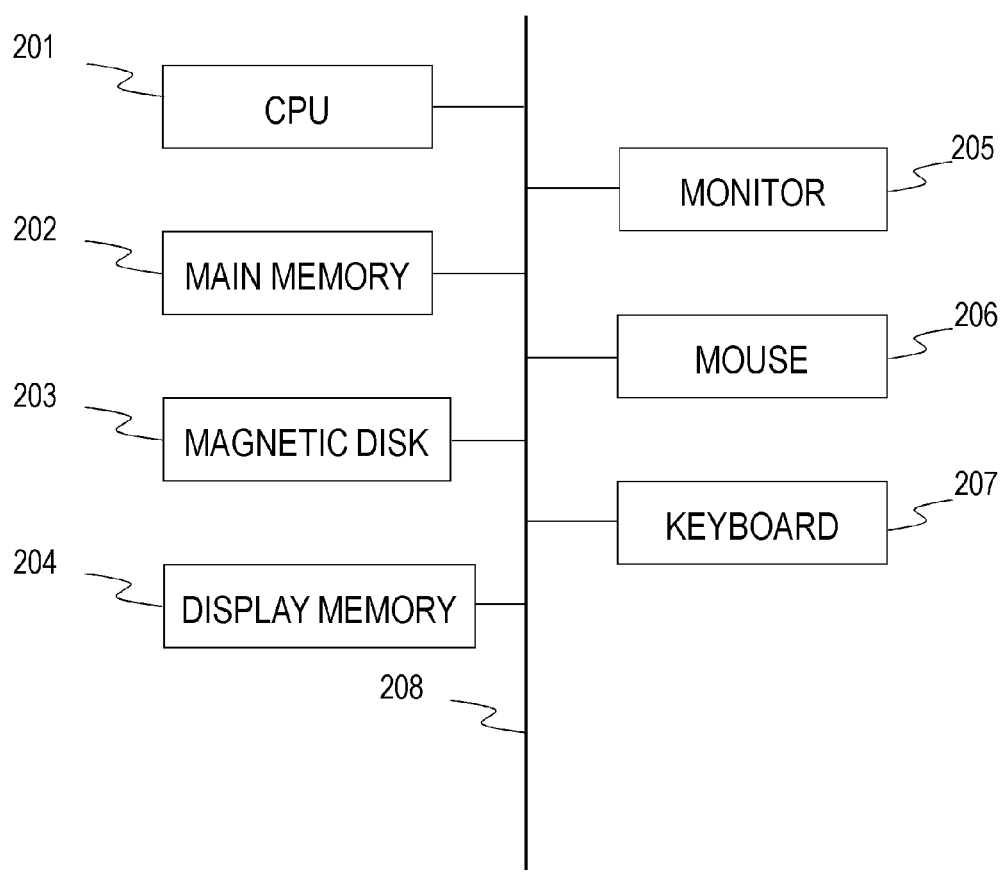
FIG. 2 illustrates an example of a hardware configuration of an image processing apparatus according to the first embodiment.

(Hardware Configuration) FIG. 2 illustrates an example of a hardware configuration of the image processing apparatus 100. The image processing apparatus 100 has a configuration of a known computer (information processing apparatus). The image processing apparatus 100 includes a CPU 201, a main memory 202, a magnetic disk 203, a display memory 204, a monitor 205, a mouse 206, and a keyboard 207 as its hardware configuration.

The CPU (central processing unit) 201 mainly controls the operation of each constituent element. The main memory 202 stores a control program executed by the CPU 201 and provides a work area used when the CPU 201 executes the program. The magnetic disk 203 stores an OS (operating system), a device driver of a peripheral device, and programs for implementing various kinds of application software including a program for performing processing described below, etc. The functions (software) of the image processing apparatus 100 illustrated in FIG. 1 and processing illustrated in a flowchart described below are achieved by the CPU 201 executing the programs stored in the main memory 202, the magnetic disk 203, and the like.

The display memory 204 temporarily stores display data. The monitor 205 is, for example, a CRT monitor or a liquid crystal monitor and displays an image, text, etc., based on the data received from the display memory 204. The mouse 206 and the keyboard 207 are provided for a user to perform pointing input and input of a character, or the like, respectively. The above constituent elements are communicatively connected to each other via a common bus 208.

The CPU 201 is an example of a processor or a control unit. In addition to the CPU 201, the image processing apparatus 100 may include at least any one of a GPU (graphics processing unit) and an FPGA (field-programmable gate array). Alternatively, in place of the CPU 201, the image processing apparatus 100 may include at least any one of a GPU and an FPGA. The main memory 202 and the magnetic disk 203 are examples of a memory or a storage device.

Figure 3:
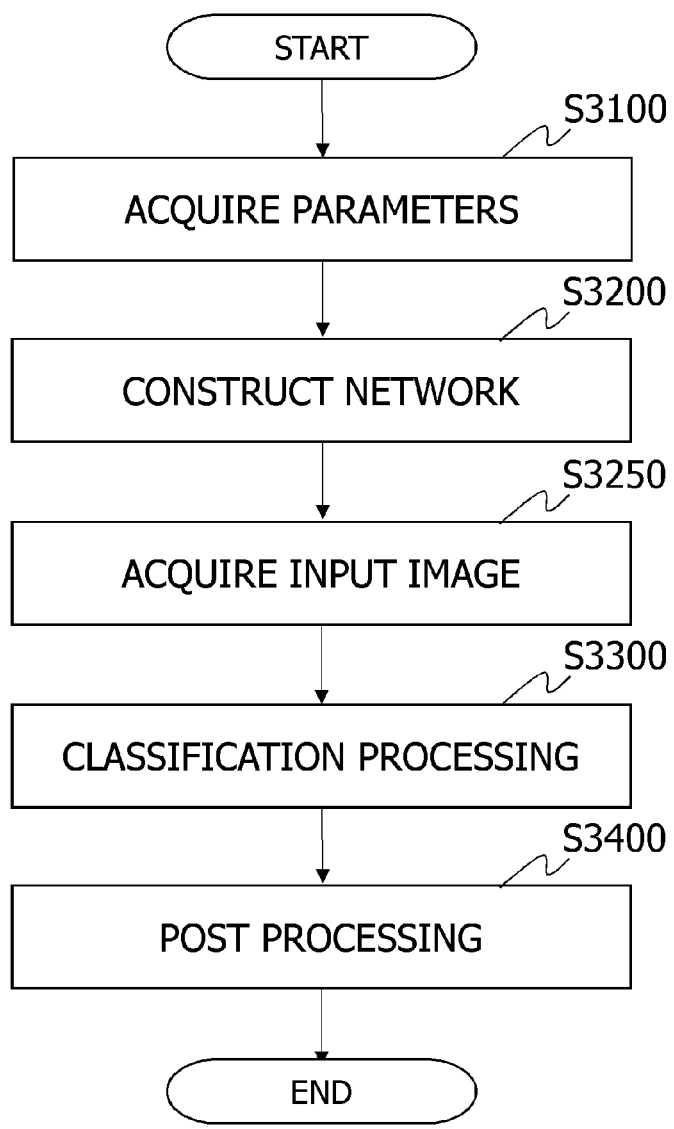
FIG. 3 illustrates an example of a processing procedure of the image processing apparatus 100 according to the first embodiment.

(Processing Procedure) A processing procedure of the image processing apparatus 100 according to the present embodiment will be described with reference to FIG. 3.

Step S3100. In this step, the first data acquisition unit 110 acquires parameters of a CNN in the classification unit 130 from the storage device 70. The first data acquisition unit 110 then transmits the acquired parameters of the CNN to the first network construction unit 120.

Step S3200. In this step, the first network construction unit 120 constructs a CNN based on the parameters of the CNN received from the first data acquisition unit 110. The first network construction unit 120 then transmits the constructed CNN to the classification unit 130.

Figure 4:
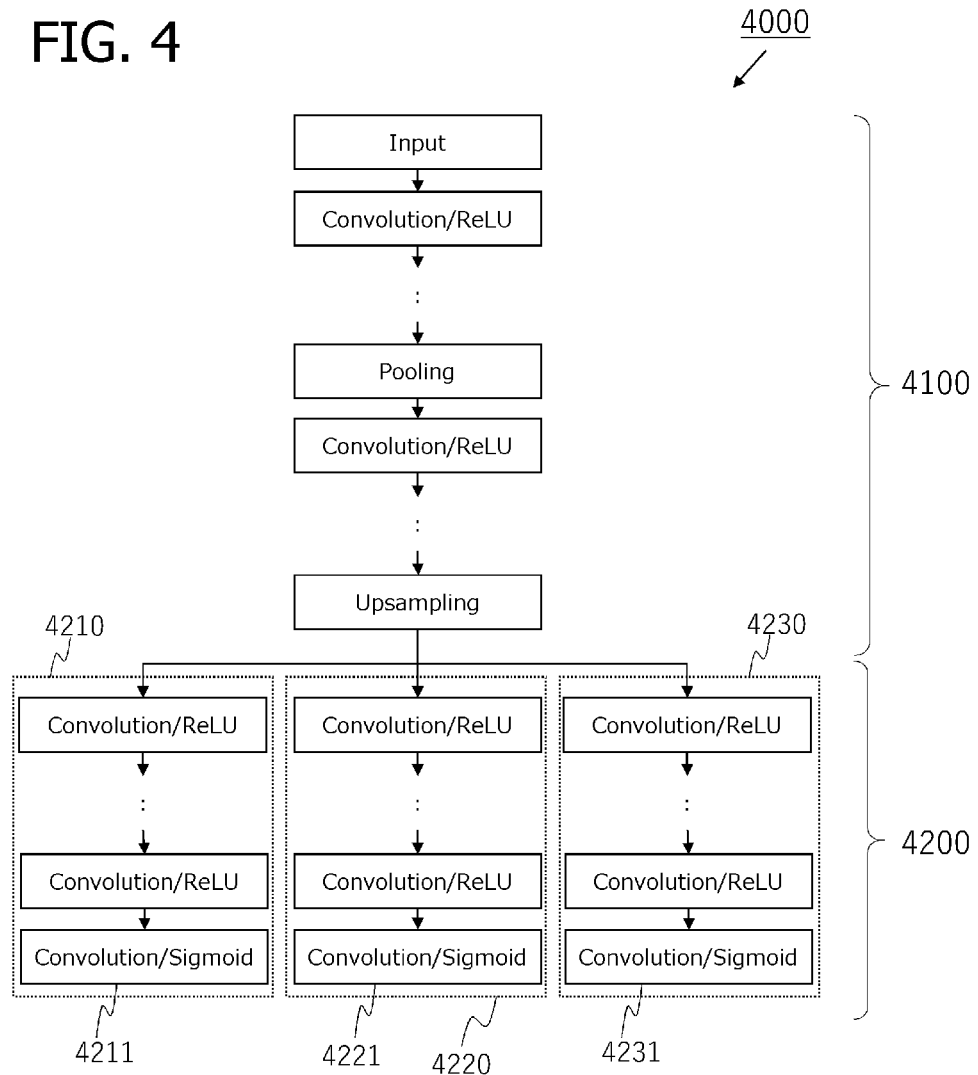
FIG. 4 illustrates a configuration of a convolutional neural network (CNN) according to the first embodiment.

A configuration of the CNN according to the present embodiment will be described with reference to FIG. 4. A CNN 4000 according to the present embodiment is configured by connecting a plurality of single-class networks 4200 to a common network 4100.

The common network 4100 is a network common to a plurality of classes. The common network 4100 includes an input layer that receives input and a plurality of convolution layers and serves to extract a first feature from the input image. While a pooling layer and an upsampling layer are used to configure the common network 4100 in the present embodiment, the common network 4100 may further include another layer such as a batch normalization layer. The individual convolution layer is configured to apply an activation function to a feature map, which is a result obtained from convolution processing. The present embodiment adopts a ReLU (rectified linear unit) as the activation function in the common network 4100.

The plurality of single-class networks 4200 is a plurality of networks, each of which corresponds to a corresponding one of the plurality of classes. The present embodiment includes three single-class networks, which are a liver network 4210 that is a network corresponding to a liver, a kidney network 4220 that is a network corresponding to kidneys, and a gallbladder network 4230 that is a network corresponding to a gallbladder. Each of the plurality of single-class networks 4200 includes a plurality of convolution layers and serves to extract a second feature based on the first feature extracted by the common network 4100. Each of the plurality of single-class networks 4200 is provided with a single-class output layer at its terminal end for individually classifying its corresponding class. Specifically, a single-class output layer 4211 for classifying the liver class is provided at the end of the liver network 4210. Likewise, single-class output layers 4221 and 4231 for classifying the corresponding classes are provided at the respective ends of the kidney network 4220 and the gallbladder network 4230. Each of these single-class output layers is a convolution layer, and a sigmoid function is set as an activation function. The sigmoid function normalizes an input value to a range from 0 to 1. Thus, each of the plurality of single-class networks 4200 outputs an image having a pixel value of each pixel from 0 to 1.

The CNN 4000 used in the present embodiment is, for example, a 2D-CNN. The 2D-CNN receives a two-dimensional image as an input and outputs a classification result for the two-dimensional image. Thus, the 2D-CNN receives two-dimensional tomographic images (a kind of two-dimensional images) constituting an abdominal CT image (a three-dimensional tomographic image) by an input layer, performs two-dimensional processing in the other layers constituting the CNN, and outputs classification results for the two dimensional tomographic images.

The CNN 4000 configured as described above has a plurality of parameters. For example, a weight in the convolution layer corresponds to the parameter. In step S3200, the CNN that performs segmentation to extract the liver region, the kidney region, and the gallbladder region is constructed by setting parameters obtained in the training process described below. This enables the CNN according to the present embodiment to output a feature map from the single-class output layer provided at each end of the plurality of single-class networks 4200 as a classification result of the class corresponding to each of the plurality of single-class networks 4200. For example, the liver network 4210 outputs a feature map of the liver that represents the likelihood of the liver by a pixel value of each pixel from 0 to 1. Likewise, the kidney network 4220 and the gallbladder network 4230 output feature maps corresponding to the respective classes.

By using a training method that will be described below, the CNN 4000 according to the present embodiment can still utilize training data (incomplete training data) that does not include at least one of the ground truth images, which are the ground truth image of the liver, the ground truth image of the kidneys, and the ground truth image of the gallbladder, for training. That is, the CNN 4000 can utilize training data for training even when the training data includes missing ground truth data corresponding to at least one of the classes each of which represents a corresponding one of the plurality of target objects.

Here, a comparison will be made between the CNN 4000 according to the present embodiment and a CNN in a method in which the CNN for classifying single-classes is prepared as many as the number of the classes each of which represents a target object. Comparing these two CNNs, since the former (the CNN 4000 according to the present embodiment) has a portion where the networks are made common by the common network 4100, the calculation costs for the inference process and the training process of the former are lower than those of the latter. In addition, the common network 4100 can use all the incomplete training data for training, such as incomplete training data including only the ground truth image of the liver, incomplete training data including only the ground truth image of the kidneys, and incomplete training data including only the ground truth image of the gallbladder. This allows the common network 4100 to learn more features so that an improvement in classification accuracy of the CNN can be expected.

While the CNN 4000 according to the present embodiment receives a two-dimensional image as an input and outputs a classification result for the two-dimensional image (one type of 2D-CNN), the type of the CNN is not limited thereto. For example, the CNN of the present embodiment may be a CNN that belongs to a 3D-CNN, which receives a three-dimensional image as an input and outputs a classification result for the three-dimensional image. In this case, the CNN includes layers that perform three-dimensional processing, for example. In addition, the input may have any number of dimensions, and there are no restrictions on the layers included in the classifier.

While the CNN 4000 according to the present embodiment includes only one common network that is common to all the classes, one or more common networks, each of which is common to a part of and a plurality of all the classes may be included. For example, the common network may include a first common network that is common to a first class and a second class, and a second common network that is common to the first class and a third class. In this case, the first common network and the second common network are connected to a single-class network corresponding to the first class. For example, the CNN 4000 may include a common network that is common to a liver class, and a kidney class and a common network that is common to a liver class and a gallbladder class. In this case, a liver network and a kidney network are connected to the common network common to the liver class and the kidney class, and likewise, the liver network and a gallbladder network are connected to the common network common to the liver class and the gallbladder class. In this configuration, two feature maps (first features) extracted from the two respective common networks are input to the liver network. Thus, for example, the two first features may be concatenated by a concatenation layer that concatenates two feature maps, or the two feature maps are added up to be integrated, and the combined feature map is input to the liver network. In the human body, the liver is adjacent to the kidneys, and the liver is adjacent to the gallbladder. However, the kidneys are rarely adjacent to the gallbladder. Therefore, as described above, the kidneys and the gallbladder can be separated into different common networks to avoid unnecessary feature training so that an improvement in classification accuracy can be expected.

While each of the single-class networks 4200 in the CNN 4000 according to the present embodiment includes a plurality of convolution layers, the individual single-class network 4200 may only include a single-class output layer. In addition, each of the single-class networks 4200 may have an identical layer configuration or a different layer configuration.

Step S3250. In this step, the first data acquisition unit 110 receives an input image from the storage device 70 and transmits the received input image to the classification unit 130.

Step S3300. In this step, the classification unit 130 inputs the input image received from the first data acquisition unit 110 to the CNN constructed by the first network construction unit 120 and performs forward propagation to execute the inference processing. In the present embodiment, a likelihood map of the liver, a likelihood map of the kidneys, and a likelihood map of the gallbladder are obtained as results of the classification processing performed on the input image by the CNN.

In this step, first, the input image is input to the CNN 4000. The CNN 4000 receives the input image by the input layer in the common network 4100 and forward-propagates the received input image to subsequent layers while applying processing of each layer. The abdominal CT image received by the input layer or the feature map obtained as a processing result of the previous layer is used as an input, and processing of each subsequent layer is applied to the input so as to output a feature map. When the processing in the common network 4100 is completed, the feature map, which is the output of the common network 4100, is input to each of the single-class networks 4200. As in the common network 4100, each of the single-class networks 4200 performs forward propagation. In this step, the forward propagation in the liver network 4210, the kidney network 4220, and the gallbladder network 4230 may be performed in parallel or in sequence. When the forward propagation in each of the single-class networks is completed, a likelihood map of the liver is output from the liver network, a likelihood map of the kidneys is output from the kidney network, and a likelihood map of the gallbladder is output from the gallbladder network.

In the above description, the forward propagation is performed in all the single-class networks. However, the forward propagation may be performed only partially in the single-class networks. For example, when only the classification result for the liver is needed, the forward propagation may be performed only in the common network 4100 and the liver network 4210. Alternatively, in step S3200, the first network construction unit 120 may construct a network only including, for example, the common network 4100 and the liver network 4210. In this case, the kidney network 4220 and the gallbladder network 4230 are used only in the training process. In this way, only a desired classification result can be obtained while the calculation costs are reduced.

Step S3400. In this step, the classification unit 130 performs post processing on each of the likelihood map of the liver, the likelihood map of the kidneys, and the likelihood map of the gallbladder and outputs respective segmentation results.

In the present embodiment, threshold processing and largest connected component acquisition processing are applied as the post processing. First, the classification unit 130 performs the threshold processing on each of the likelihood maps by using a threshold t=0.5. In the threshold processing, a pixel value (likelihood) of each pixel in each likelihood map is compared with the threshold t, and the pixel value is replaced by zero or one so as to convert the likelihood map into a binary image. Next, the classification unit 130 performs the largest connected component acquisition processing on the binary image obtained by performing the threshold processing. Since the liver and the gallbladder are both a single organ, an isolated noise region can be eliminated by acquiring the largest connected component. Since the kidneys are a pair of organs of a right kidney and a left kidney, an isolated noise region can also be eliminated by dividing the binary image of the kidneys into a left portion and a right portion and then acquiring the largest connected component for each of the right image and the left image. The classification unit 130 outputs each of the binary images obtained after the above post processing has been performed as a segmentation result.

While the threshold processing and the largest connected component acquisition processing are performed as described above as the post processing, the post processing is not limited thereto. For example, segmentation by a graph cut method may be applied. In this case, data terms of an energy function may be designed based on each likelihood map. In addition, to eliminate an overlapping region, the greatest likelihood may be acquired at the same coordinates in each likelihood map, and based on the acquired likelihood, binary image conversion processing may be performed. Any other post processing may also be applied.

Step S3400 is not necessarily needed and may therefore be omitted. In that case, the classification unit 130 outputs the likelihood map of the liver, the likelihood map of the kidneys, and the likelihood map of the gallbladder as segmentation results for the liver, the kidneys, and the gallbladder.

In accordance with the above procedure, the image processing apparatus 100 according to the present embodiment obtains segmentation results for the liver, the kidneys, and the gallbladder from the abdominal CT image and outputs the segmentation results to the storage device 70 and the monitor 205.

In a case when there is a plurality of input images to be processed by the classification unit 130, the processing from step S3250 to step S3400 may be repeatedly performed on each of the input images. In the present embodiment, the classification unit 130 repeatedly performs the processing from step S3250 to step S3400 on each of the two-dimensional tomographic images constituting the abdominal CT image as the processing targets.

<Training Process> Next, a configuration of the image processing apparatus 500 according to the present embodiment will be described.

Figure 5:
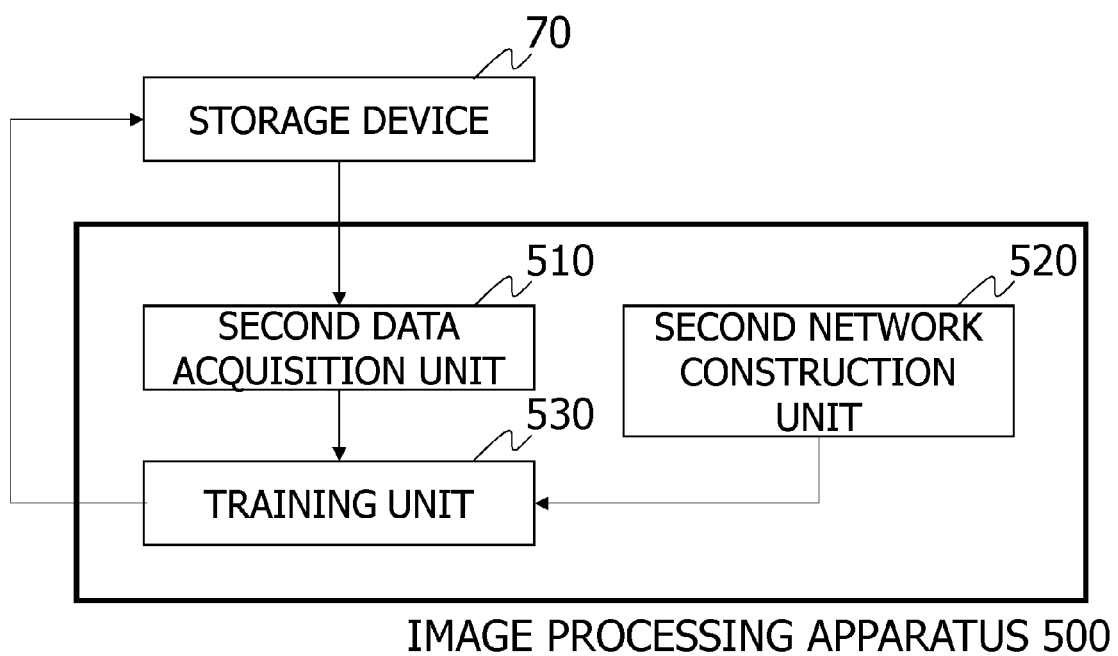
FIG. 5 illustrates an example of a function configuration of an image processing apparatus 500 according to the first embodiment.

(Functional Configuration) A functional configuration of the image processing apparatus 500 according to the present embodiment will be described with reference to FIG. 5. As illustrated in FIG. 5, the image processing apparatus 500 includes a second data acquisition unit 510 that acquires training data, a second network construction unit 520 that constructs a CNN, and a training unit 530 that trains the CNN by using the training data. Further, the image processing apparatus 500 according to the present embodiment is communicatively connected to an external storage device 70.

The storage device 70 is an example of a computer-readable storage medium. The storage device 70 holds a plurality of training data. The training data will be described in detail below.

The second data acquisition unit 510 acquires training data from the storage device 70. The second data acquisition unit 510 then transmits the acquired training data to the training unit 530.

The second network construction unit 520 constructs a CNN and initializes parameters. The second network construction unit 520 then transmits the constructed CNN to the training unit 530.

The training unit 530 receives a plurality of training data from the second data acquisition unit 510 and receives the CNN from the second network construction unit 520. Next, the training unit 530 trains the CNN by using a training method, which will be described below, and stores parameters of the CNN after the training in the storage device 70.

At least a part of the units of the image processing apparatus 500 illustrated in FIG. 5 may be implemented as an independent device. In addition, each unit of the image processing apparatus 500 may be implemented as software that executes the corresponding function or by dedicated hardware. In the present embodiment, each unit is implemented by software.

(Hardware Configuration) Since a hardware configuration of the image processing apparatus 500 is the same as that of the image processing apparatus 100 illustrated in FIG. 2, a description thereof will be omitted.

Figure 6A:
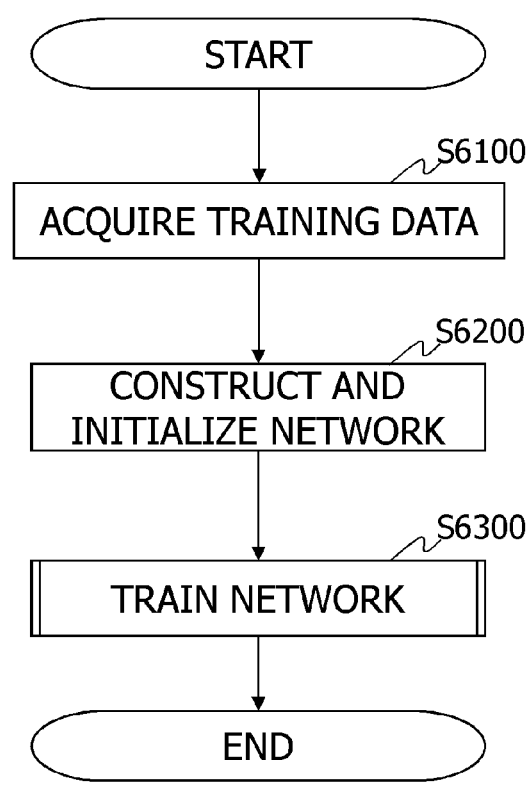
FIGS. 6A and 6B illustrate examples of processing procedures of the image processing apparatus 500 according to the first embodiment.
Figure 6B:
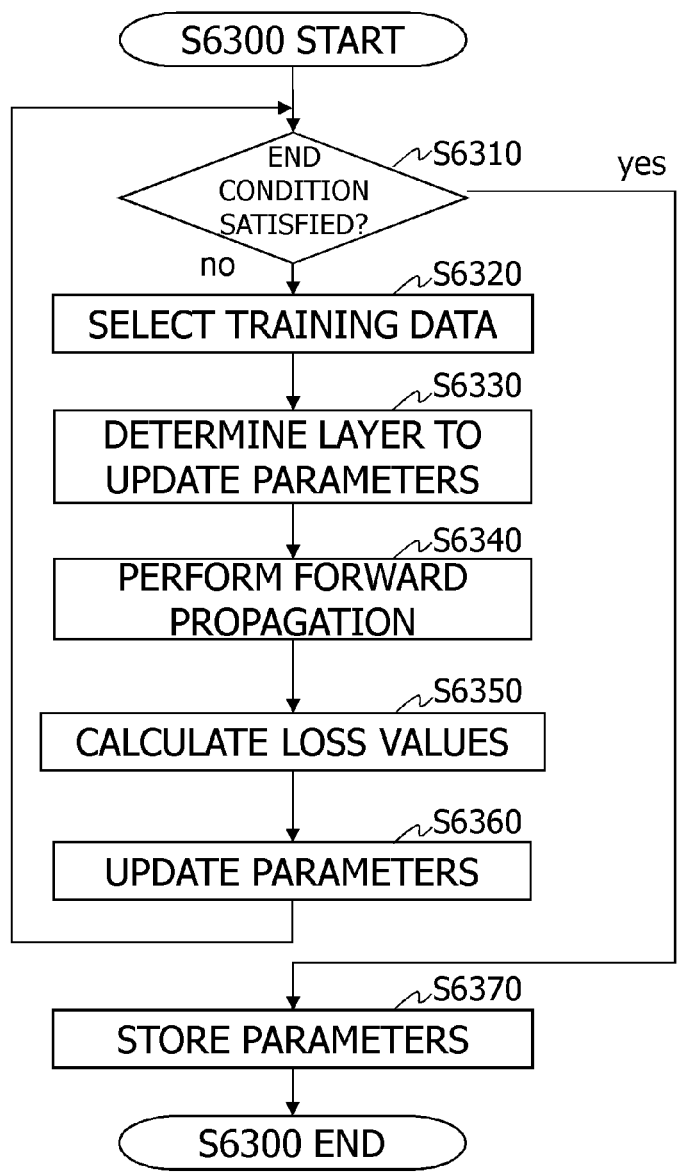

(Processing Procedure) A processing procedure of the image processing apparatus 500 according to the present embodiment will be described with reference to FIGS. 6A and 6B.

Step S6100. In this step, the second data acquisition unit 510 acquires a plurality of training data from the storage device 70. The second data acquisition unit 510 then transmits the plurality of training data acquired to the training unit 530.

The training data will be described with reference to FIGS. 7A to 7D. In the present embodiment, the training data includes a training image 710 and ground truth data corresponding to the training image 710. The training image 710 is an image having attributes similar to those of an image to be processed by the CNN. In the present embodiment, the training image 710 is an abdominal CT image. In the present embodiment, the ground truth data is a ground truth image 711 of the liver, a ground truth image 712 of the kidneys, and a ground truth image 713 of the gallbladder. The ground truth images 711, 712, and 713 are data indicating the locations or regions of the liver, the kidneys, and the gallbladder, respectively, in the training image 710. The training data is also referred to as training data, teacher data, or training data. The ground truth image is also referred to as a correct label image.

Figure 7A:
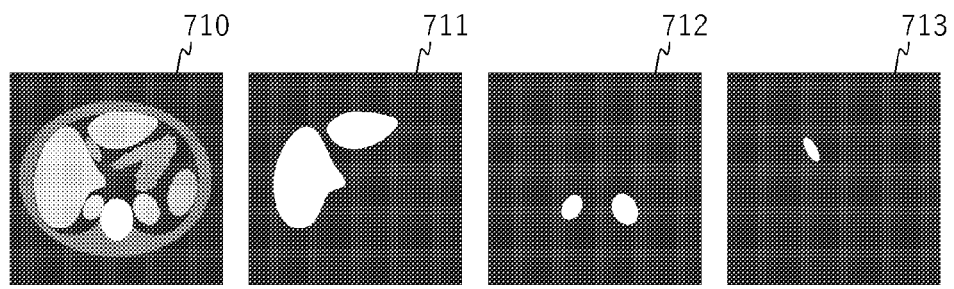
FIGS. 7A to 7D illustrate examples of training data according to the first embodiment.
Figure 7B:
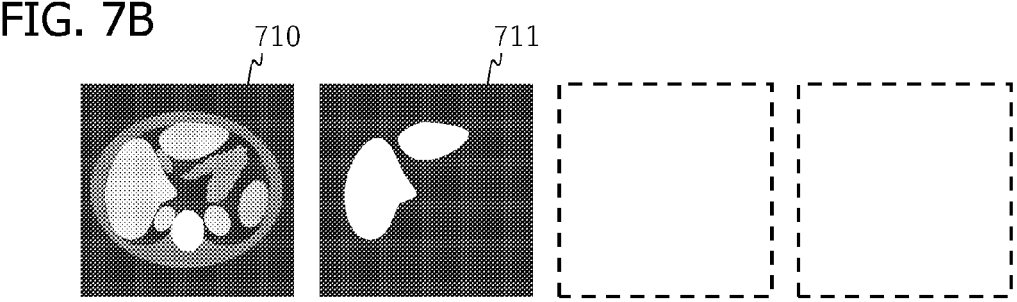
Figure 7C:
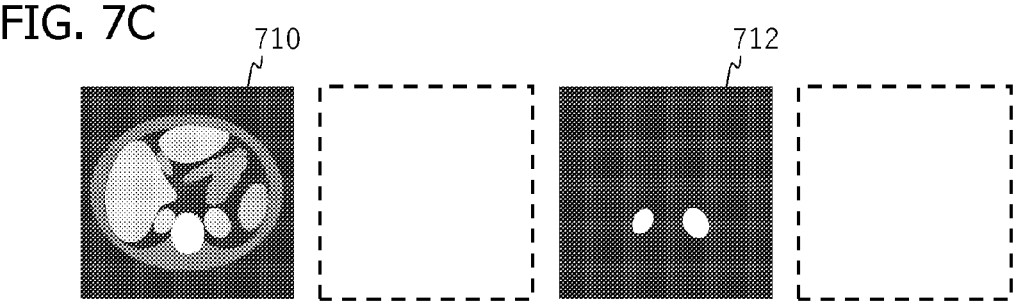
Figure 7D:
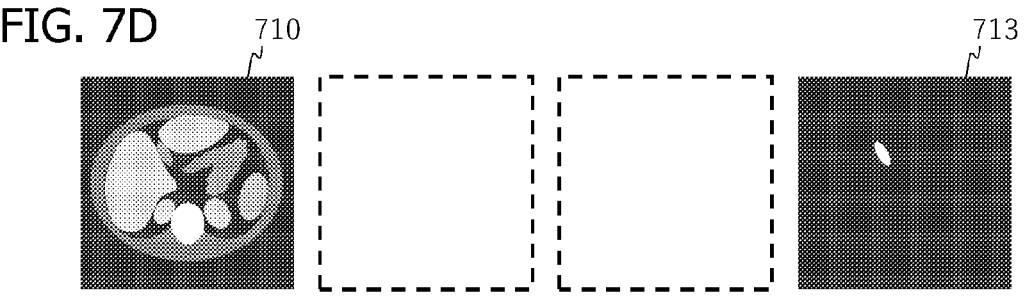

FIGS. 7A to 7D illustrate four types of training data. FIG. 7A illustrates training data that includes all the ground truth images, which are the ground truth image 711 of the liver, the ground truth image 712 of the kidneys, and the ground truth image 713 of the gallbladder, with respect to the training image 710. This training data is referred to as complete training data. FIG. 7B illustrates training data that only includes the ground truth image 711 of the liver with respect to the training image 710. In other words, the ground truth image of the kidneys and the ground truth image of the gallbladder are not included (are missing) in this training data. This training data is referred to as incomplete training data. Likewise, FIG. 7C illustrates incomplete training data that only includes the ground truth image 712 of the kidneys with respect to the training image. FIG. 7D illustrates incomplete training data that only includes the ground truth image 713 of the gallbladder with respect to the training data.

In step S6100, the second data acquisition unit 510 acquires the above four types of training data as appropriate. That is, the second data acquisition unit 510 may acquire only the incomplete training data or both the incomplete training data and the complete training data. Of course, the second data acquisition unit 510 may acquire only the complete training data.

While, for the sake of simplicity, the four types of training data have been described by only using the training image 710 as an example, the same training image may be included or may not be included in the four types of training data. The case when the same training image is not included indicates that no overlapping training image is included in the four types of training data. In addition, while FIGS. 7A to 7D illustrate the training data that only includes the ground truth image corresponding to one of the plurality of classes as incomplete training data, the training data may include any number of ground truth images. For example, incomplete training data that includes the ground truth image of the liver and the ground truth image of the kidneys and does not include the ground truth image of the gallbladder may also be used.

Step S6200. In this step, the second network construction unit 520 constructs a CNN and initializes parameters. The second network construction unit 520 then transmits the constructed CNN to the training unit 530.

In the present embodiment, the second network construction unit 520 uses the same CNN as that used in the image processing apparatus 100. Parameters of the CNN are initialized by a known method such as a method for determining an initial value proposed by He, et al. [Kaiming He, et al., "Delving Deep into Rectifiers: Surpassing Human-Level Performance on ImageNet Classification," ICCV, 2015] and a method in which a constant value or a random number value is used as an initial value. The parameters may also be initialized by acquiring initial values of the parameters of the CNN from the storage device 70. This method is used for initializing the parameters when the parameters obtained from the previous training process are transferred (transfer training), for example.

The CNN constructed by the second network construction unit 520 may not have the same configuration as the CNN used in the image processing apparatus 100. For example, to improve generalization performance by training, a dropout layer may be added to the configuration. In addition, for example, even when the gallbladder network 4230 (one of the single-class networks) is not used in the classification process, the gallbladder network 4230 may be connected to the common network 4100 to construct the CNN in the training process. This allows the training data including only the ground truth data of the gallbladder to be used for training so that the common network can learn more features. Thus, an improvement in generalization performance can be expected.

Step S6300. In this step, the training unit 530 uses a plurality of training data received from the second data acquisition unit 510 to learn the CNN received from the second network construction unit 520 by using a training method described below. The training unit 530 then stores the parameters of the CNN after the training in the storage device 70.

The training method will be described with reference to FIG. 6B.

Step S6310. In this step, the training unit 530 determines whether the progress in training of the CNN, etc., satisfies a condition for terminating the training. A known method is used as the training termination condition, such as a condition regarding the number of epochs and a condition regarding loss-value convergence. If the progress in training of the CNN does not satisfy the training termination condition, the processing proceeds to step S6320. If the progress in training of the CNN satisfies the training termination condition, the processing proceeds to step S6370.

Step S6320. In this step, the training unit 530 selects a set of any training data (a set of a training image and ground truth data) from a plurality of training data.

In the present embodiment, the training unit 530 treats an attribute of training data as one group and sequentially selects the training data on a group basis. The attribute of training data refers to information indicating to which class the ground truth data (ground truth image) included in the training data corresponds. That is, the training unit 530 groups the training data based on to which class the ground truth data included in the training data corresponds and performs training by selecting the training data on a group basis to be used in one epoch. In the present embodiment, the storage device 70 holds information (attribute information) about the attributes of respective training data. The training unit 530 obtains the attribute of each of the training data by referring to the attribute information and performs processing based on the attribute. First, the training unit 530 selects complete training data from the plurality of training data and sequentially performs step S6300, for example. When no more unprocessed complete training data remains, the training unit 530 then selects incomplete training data of the liver and sequentially performs step S6300 in a similar manner. Next, the training unit 530 sequentially performs step S6300 on the incomplete training data of the kidneys and the incomplete training data of the gallbladder. This cycle is referred to as one epoch. When step S6300 has been performed on all the groups of the training data, the processing is performed in the same order starting from the complete training data again. As described above, the attribute of training data is treated as one group, and the groups of training data are sequentially learned by the CNN. This prevents occurrence of a limit cycle, and stable training is thus achieved.

The training data may be selected in any order. The above method leaves a relatively strong impact of the group selected immediately before the training is terminated on the parameters. For example, in the above method, if the number of epochs is set as the termination condition in step S6310, the incomplete training data including only the ground truth image of the gallbladder is the last training data to be learned. In this case, the classification accuracy of the gallbladder may increase, and the classification accuracy of the liver and kidneys whose ground truth data is not included in the training data may decrease. To avoid this, for example, a method in which the training data is randomly selects or a method in which, based on the above method, the complete training data is learned at the end of one epoch may be adopted.

Step S6330. In this step, the training unit 530 determines the layer whose parameters are to be updated based on the attribute of the training data selected in step S6320. That is, in this step, based on to which class the ground truth data included in the selected training data corresponds, the training unit 530 determines the layer whose parameters are to be updated, the parameters being used when training is performed by using the training data.

If the complete training data illustrated in FIG. 7A is selected in step S6320, in this step, the training unit 530 determines all the layers included in the common network 4100 and the plurality of single-class networks 4200 as the layers whose parameters are to be updated.

If the incomplete training data including only the ground truth image of the liver illustrated in FIG. 7B is selected, in this step, the training unit 530 determines the layers included in the common network 4100 and the liver network 4210 as the layers whose parameters are to be updated. If the incomplete training data including only the ground truth image of the kidneys illustrated in FIG. 7C or the incomplete training data including only the ground truth image of the gallbladder illustrated in FIG. 7D is selected, the training unit 530 determines the layers whose parameters are to be updated in a similar manner. That is, if the incomplete training data is elected in step S6320, the training unit 530 determines the layers included in the common network 4100 and the single-class network that corresponds to the class whose ground truth image is included in the training data as the layers whose parameters are to be updated.

The layer whose parameters are not to be updated may be determined as appropriate. For example, while the parameters of the layers included in the common network 4100 are determined to be updated in all the cases described above, the parameters of some predetermined layers may be fixed. In this way, for example, in a case when parameters that have previously been learned are transferred in step S6200, the transferred parameters can be used without change.

Step S6340. In this step, the training unit 530 inputs the training image of the training data selected in step S6320 to the CNN and performs forward propagation. This obtains a provisional classification result (likelihood map) based on the current parameters.

The forward propagation may always be performed on the entire range of the networks, irrespective of the attribute of the training data. However, unnecessary calculations may be omitted by performing the processing only on the range needed for the processing in step S6350 based on the attribute. That is, if the complete training data illustrated in FIG. 7A is selected in step S6320, in this step, the training unit 530 performs the forward propagation on the entire range of the common network 4100 and the plurality of single-class networks 4200. Thus, a provisional classification result for the liver is obtained from the liver network 4210. Likewise, a provisional classification result for the kidneys is obtained from the kidney network 4220, and a provisional classification result for the gallbladder is obtained from the gallbladder network 4230.

If the incomplete training data including only the ground truth image of the liver illustrated in FIG. 7B is selected in step S6320, in this step, the training unit 530 performs the forward propagation on the common network 4100 and the liver network 4210. Thus, a provisional classification result for the liver is obtained from the liver network 4210. In this case, since a provisional classification result for the kidneys and a provisional classification result for the gallbladder are not used in subsequent steps, the forward propagation is not performed on the kidney network 4220 and the gallbladder network 4230. If the incomplete training data including only the ground truth image of the kidneys illustrated in FIG. 7C or the incomplete training data including only the ground truth image of the gallbladder illustrated in FIG. 7D is selected, the forward propagation is performed in a similar manner, and a corresponding provisional classification result is obtained. That is, if the incomplete training data is selected in step S6320, the training unit 530 performs the forward propagation on the common network 4100 and the single-class network corresponding to the class whose ground truth image is included in the training data, and a corresponding provisional classification result is obtained.

Step S6350. In this step, the training unit 530 calculates a loss value based on the ground truth image in the training data selected in step S6320 and the provisional classification result obtained in step S6340.

If the complete training data illustrated in FIG. 7A is selected in step S6320, a provisional classification result for the liver, a provisional classification result for the kidneys, and a provisional classification result for the gallbladder are obtained in step S6340. Thus, in this step, the training unit 530 calculates loss values of the respective classes based on the respective ground truth images in the training data and the respective provisional classification results output from the plurality of single-class networks 4200. More specifically, the training unit 530 calculates a loss value for the provisional classification result for the liver by a loss function $L_{liver}(y_{liver}, t_{liver})$ based on the ground truth image of the liver $t_{liver}$ and the provisional classification result for the liver $y_{liver}$ output by the liver network 4210. Likewise, the training unit 530 calculates a loss value for the provisional classification result for the kidneys by a loss function $L_{kidney}(y_{kidney}, t_{kidney})$ and a loss value for the provisional classification result for the gallbladder by a loss function $L_{gallbladder}(y_{gallbladder}, t_{gallbladder})$.

If the incomplete training data including only the ground truth image of the liver illustrated in FIG. 7B is selected in step S6320, a provisional classification result for the liver is obtained in step S6340. Thus, in this step, the training unit 530 calculates a loss value for the provisional classification result for the liver by a loss function $L_{liver}(y_{liver}, t_{liver})$ based on the ground truth image of the liver in the training data and the provisional classification result for the liver output by the liver network 4210. If the incomplete training data including only the ground truth image of the kidneys illustrated in FIG. 7C or the incomplete training data including only the ground truth image of the gallbladder illustrated in FIG. 7D is selected, the training unit 530 calculates a corresponding loss value in a similar manner. That is, if the incomplete training data is selected in step S6320, the training unit 530 calculates a loss value for the corresponding provisional classification result based on the corresponding ground truth image and the provisional classification result corresponding to the class whose ground truth image is included in the training data.

A known loss function may be used as the above loss function. For example, MSE (mean squared error) or cross entropy may be used. In addition, a loss value may be calculated by using the same loss function or different loss functions for the outputs of the respective single-class output layers, which are the plurality of provisional classification results. For example, a loss value for the provisional result for the liver may be calculated by using the MSE, and loss values for the provisional result for the kidneys and the provisional result for the gallbladder may be calculated by using the cross entropy. In addition, a weight may be applied to each loss value. For example, if training is performed by placing more weight on the liver, a greater weight is applied to the loss value for the provisional result for the liver, and a lesser weight is applied to the loss values for the provisional result for the kidneys and the provisional result for the gallbladder.

Step S6360. In this step, the training unit 530 updates parameters based on the information about the layer whose parameters are determined to be updated in step S6330 and the loss value calculated in step S6350 for each of the provisional results.

If the complete training data illustrated in FIG. 7A is selected in step S6320, a loss value for the provisional classification result for the liver, a loss value for the provisional classification result for the kidneys, and a loss value for the provisional classification result for the gallbladder are obtained in step S6350. Thus, in this step, the training unit 530 updates the parameters based on the corresponding loss value by using a known method such as backpropagation. This step will be described by using backpropagation as an example. The loss value for the provisional classification result for the liver is a loss value for the output of the liver network 4210. Thus, the training unit 530 calculates a gradient of the loss value for the provisional classification result for the liver by performing backpropagation starting from the single-class output layer 4211 provided at the end of the liver network 4210 for classifying the liver class. Likewise, the training unit 530 calculates a gradient of the loss value for the provisional classification result for the kidneys by performing backpropagation starting from the single-class output layer 4221 for classifying the kidney class. The training unit 530 calculates a gradient of the loss value for the provisional classification result for the gallbladder by performing backpropagation starting from the single-class output layer 4231 for classifying the gallbladder class. In the common network 4100, the backpropagation is performed to calculate a gradient by using a value backpropagated through each of the plurality of single-class networks 4200. The training unit 530 then updates the parameters of the layer whose parameters are determined to be updated in step S6330 based on the gradient.

If the incomplete training data including only the ground truth image of the liver illustrated in FIG. 7B is selected in step S6320, a loss value for the provisional classification result for the liver is obtained in step S6350. Thus, in this step, the training unit 530 calculates a gradient of the loss value for the provisional classification result for the liver by performing backpropagation starting from the single-class output layer 4211 provided at the end of the liver network 4210 for classifying the liver class. In the common network 4100, the backpropagation is performed to calculate a gradient by using a value back-propagated through the liver network 4210. The training unit 530 then updates the parameters of the layer whose parameters are determined to be updated in step S6330 based on the gradient. If the incomplete training data including only the ground truth image of the kidneys illustrated in FIG. 7C or the incomplete training data including only the ground truth image of the gallbladder illustrated in FIG. 7D is selected, the corresponding parameters are updated in a similar manner.

Step S6370. In this step, the training unit 530 stores the parameters of the CNN in the storage device 70 and ends step S6300.

In accordance with the above procedure, the image processing apparatus 500 according to the present embodiment generates the parameters of the CNN of the image processing apparatus 100.

<Advantageous Effects of the Present Embodiment> As described above, the CNN of the image processing apparatus 100 and the image processing apparatus 500 according to the present embodiment can learn by using the training data that does not include at least one of the ground truth images, which are the ground truth image of the liver, the ground truth image of the kidneys, and the ground truth image of the gallbladder. That is, this CNN can utilize training data for training even when the training data includes missing ground truth data corresponding to at least one of the classes, each of which represents a corresponding one of the plurality of target objects.

Second Embodiment

<Summary> The CNN in the first embodiment has the configuration in which, even incomplete training data can be used for training by connecting the single-class networks, each of which corresponds to a corresponding one of the plurality of classes, to the common network. However, since the CNN in the first embodiment outputs only a classification result for a corresponding class from each end of the single-class networks, it is difficult to reflect the positional relation of the classes on the output. For example, since the liver network updates the parameters only based on the loss value for the provisional classification result for the liver, training is performed so as to classify into either the liver or the other than the liver. In other words, since the kidneys or the gallbladder is trained as one of the objects included in the other than the liver in the liver network, the positional relation with one another is difficult to be trained. The same applies to the kidney network and the gallbladder network.

The positional relations between organs, such as organs in a human body, are fixed to some extent. In such a case, an improvement in classification accuracy can be expected from training each of the positional relations between the organs (classes). Therefore, in the present embodiment, a configuration of a CNN that includes a multi-class network having a multi-class output layer so that an output reflecting a mutual positional relation can be obtained and a training method thereof will be described.

As in the first embodiment, the present embodiment is implemented by using an image processing apparatus 100 and an image processing apparatus 500. The image processing apparatus 100 performs an inference process of the CNN according to the present embodiment, and the image processing apparatus 500 performs a training process.

<Inference Process> (Functional Configuration and Hardware Configuration) Since a functional configuration and a hardware configuration of the image processing apparatus 100 according to the present embodiment are the same as those of the image processing apparatus 100 according to the first embodiment, descriptions thereof will be omitted.

(Processing procedure) A processing procedure of the image processing apparatus 100 according to the present embodiment will be described with reference to FIG. 3. Redundant descriptions of portions common to those of the image processing apparatus 100 according to the first embodiment will be omitted.

Step S3100. Since processing in this step is the same as that in step S3100 in the first embodiment, a description thereof will be omitted.

Step S3200. In this step, the first network construction unit 120 constructs a CNN based on the parameters of the CNN received from the first data acquisition unit 110. The first network construction unit 120 then transmits the constructed CNN to the classification unit 130.

Figure 8:
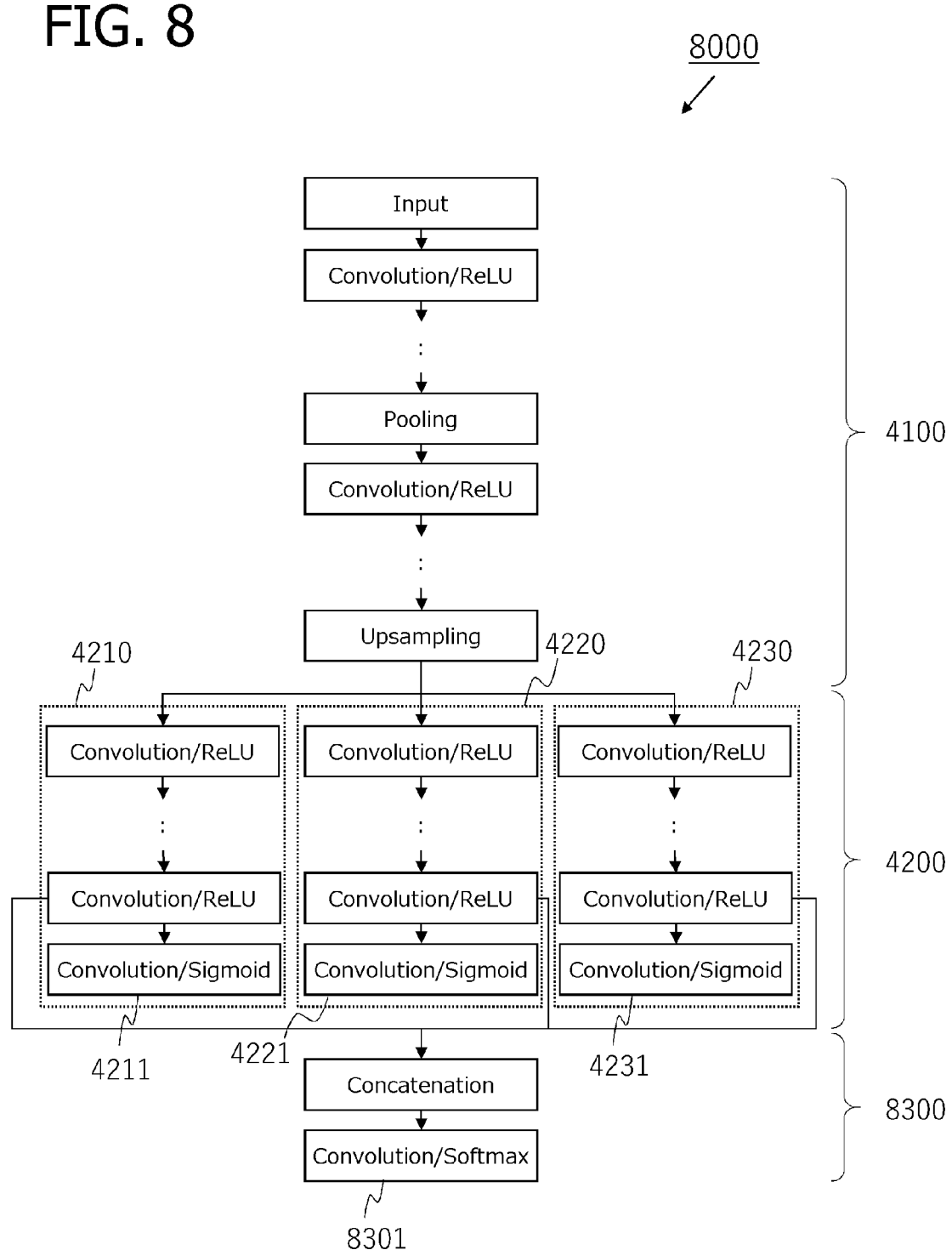
FIG. 8 illustrates a configuration of a CNN according to a second embodiment.

A configuration of the CNN according to the present embodiment will be described with reference to FIG. 8. A CNN 8000 according to the present embodiment is configured by further connecting a multi-class network 8300 to the CNN 4000 according to the first embodiment. That is, the CNN 8000 according to the present embodiment includes a common network 4100, a plurality of single-class networks 4200, and the multi-class network 8300. Since the common network 4100 and the plurality of single-class networks 4200 are the same as those of the CNN according to the first embodiment, descriptions thereof will be omitted.

The multi-class network 8300 is connected to the plurality of single-class networks 4200, and a plurality of second features (features of the respective single-classes) extracted by the respective single-class networks 4200 is input to the multi-class network 8300. The multi-class network 8300 has a multi-class output layer for classifying the plurality of classes and extracts a third feature (a feature of the multi-class) based on the second features. The multi-class network 8300 then simultaneously outputs classification results for the plurality of classes based on the third feature. Specifically, the classification results for the plurality of classes refer to likelihood maps of a liver, kidneys, a gallbladder, and the other region. The other region indicates all the region other than the liver, kidney, and gallbladder regions, rendered in an abdominal CT image. The multi-class network 8300 includes a concatenation layer for concatenating the plurality of second features. Further, the multi-class network 8300 includes a multi-class output layer 8301 at the terminal end for simultaneously outputting the respective likelihood maps of the liver, the kidneys, the gallbladder, and the other region. The multi-class output layer 8301 is a convolution layer in which a softmax function is set as an activation function.

The CNN 8000 configured as described above has a plurality of parameters. Thus, in step S3200, parameters obtained by performing a training process, which will be described below, are set in the CNN 8000 to construct the CNN that performs segmentation to extract the liver region, the kidney region, and the gallbladder region. Thus, as with the CNN according to the first embodiment, the CNN 8000 according to the present embodiment can output a likelihood map from each of the single-class output layers provided at the respective ends of the plurality of single-class networks 4200 as a classification result for a class corresponding to the single-class network. Furthermore, the CNN 8000 is enabled to output a likelihood map from the multi-class output layer provided at the end of the multi-class network 8300 as a classification result for each of the liver, the kidneys, and the gallbladder. Hereafter, the classification results output from the single-class layers provided at the respective ends of the plurality of single-class networks 4200 are referred to as a first likelihood map of the liver, a first likelihood map of the kidneys, and a first likelihood map of the gallbladder. These three likelihood maps are collectively referred to as a first likelihood map. In addition, the classification results output from the multi-class output layer 8301 provided at the end of the multi-class network 8300 are referred to as a second likelihood map of the liver, a second likelihood map of the kidneys, and a second likelihood map of the gallbladder. These three likelihood maps are collectively referred to as a second likelihood map.

The CNN 8000 according to the present embodiment can train by using the training data (incomplete training data) that does not include at least one of the ground truth images, which are the ground truth image of the liver, the ground truth image of the kidneys, and the ground truth image of the gallbladder. That is, the CNN 8000 can utilize training data for training even when the training data includes missing ground truth data corresponding to at least one of the classes, each of which represents a corresponding one of the plurality of target objects.

While the multi-class network 8300 in the CNN according to the present embodiment uses a plurality of second features extracted by the plurality of single-class networks 4200 as an input, the input is not limited thereto. For example, the first feature extracted by the common network 4100 may be input to the multi-class network 8300 as an input. That is, the multi-class network 8300 may be connected to the common network 4100. In this case, the plurality of single-class networks 4200 and the multi-class network 8300 are able to perform processing in parallel. Alternatively, the first feature and the plurality of second features may be input to the multi-class network 8300. That is, the multi-class network 8300 may be connected to the common network 4100 and the plurality of single-class networks 4200. Since the first feature has been extracted in the layer closer to the input layer than the plurality of second features, it is deemed to hold details of the abdominal CT image, which is the input. In contrast, since the plurality of second features has been extracted in the layer farther from the input layer than the first feature, it is deemed to hold higher-order information. Thus, by providing the first feature and the plurality of second features as an input, the output reflecting the characteristics of both can be obtained. As a result, an improvement in classification accuracy can be expected. In addition, in the CNN according to the present embodiment, while a single multi-class network connected to each of the plurality of single-class networks is used, one or more multi-class networks connected to at least one of the single-class networks may be used. For example, when the liver is the organ to be primarily focused on, the CNN 8000 may include two multi-class networks, each of which is connected to the liver network 4210 and one of the other two networks. More specifically, a first multi-class network is connected to the liver network 4210 and the kidney network 4220, and a second multi-class network is connected to the liver network 4210 and the gallbladder network 4230. With this configuration, the first multi-class network can more accurately train the relation between the liver and the kidneys, and, likewise, the second multi-class network can more accurately train the relation between the liver and the gallbladder.

Step S3250. Since the processing in this step is the same as that in step S3250 in the first embodiment, a description thereof will be omitted.

Step S3300. In this step, the classification unit 130 inputs the input image received from the first data acquisition unit 110 to the CNN received from the first network construction unit 120 and performs forward propagation to execute the inference processing. In the present embodiment, the first likelihood map is obtained from the plurality of single-class networks 4200, and the second likelihood map is obtained from the multi-class network 8300. Since, details of the processing in this step are the same as those in the first embodiment, descriptions thereof will be omitted.

In the present embodiment, while the classification unit 130 obtains both of the first and second likelihood maps, the classification unit 130 may obtain either one of the first and second likelihood maps. For example, in a case when the classification unit 130 is to obtain only the second likelihood map, the processing is not propagated to the single-class output layers provided at the respective ends of the plurality of single-class networks 4200 but propagated to the multi-class network 8300. Alternatively, the CNN may be constructed without the single-class output layers in step S3200. In this case, the single-class output layers used only for the training process.

Step S3400. In this step, the classification unit 130 obtains segmentation results by performing post processing on the first likelihood map and the second likelihood map, and outputs the obtained segmentation results to the storage device 70 and the monitor 205.

In this step, the classification unit 130 integrates the likelihood maps of the same class included in the first likelihood map and the second likelihood map to generate a new likelihood map (third likelihood map) of the class. Specifically, the classification unit 130 generates a third likelihood map of the liver by performing average value integration on the pixel values of the pixels included in the first likelihood map of the liver and the pixel values of the pixels included in the second likelihood map of the liver. Likewise, the classification unit 130 generates a third likelihood map of the kidneys and a third likelihood map of the gallbladder. The classification unit 130 then outputs the third likelihood map of the liver, the third likelihood map of the kidneys, and the third likelihood map of the gallbladder as the segmentation results.

While the average value integration is adopted to integrate the first likelihood map and the second likelihood map in the above method, the integration method is not limited thereto. For example, when the average value integration is performed, weights may be applied to the first likelihood map and the second likelihood map. Alternatively, maximum value integration or minimum value integration may be adopted to integrate the pixel values of the pixels included in the first likelihood map and the second likelihood map, or logical sum integration, logical product integration, or the like, may be performed after each of the likelihood maps is converted into a binary image. For example, if under extraction of the liver region tends to occur in both the first and second likelihood maps of the liver, performing the maximum value integration or the logical sum integration can reduce the under extraction of the liver region. If erroneous extraction of a region other than the liver region tends to occur in both the first and second likelihood maps of the liver, performing the minimum value integration or the logical product integration can reduce the erroneous extraction of the region other than the liver region.

The average value integration described above is an integration method in which an average value of a pixel in the first likelihood map and a pixel in the second likelihood map that correspond to each other is used as a pixel value of the integrated likelihood map. The maximum value integration, the minimum value integration, the logical sum integration, and the logical product integration may be used in a similar manner. In these integration methods, instead of the average value, the maximum value, the minimum value, the logical sum, or the logical product may be used as the pixel value after the integration.

While the processing for integrating the first likelihood map and the second likelihood map is performed as the post processing as described above, the post processing described in step S3400 of the first embodiment may be applied. Any other post processing may be applied to the first likelihood map and the second likelihood map.

This step is not necessarily needed and may therefore be omitted. In that case, the classification unit 130 outputs the first likelihood map of the liver, the first likelihood map of the kidney, the first likelihood map of the gallbladder, the second likelihood map of the liver, the second likelihood map of the kidneys, and the second likelihood map of the gallbladder as the segmentation results.

In accordance with the procedure described above, the image processing apparatus 100 according to the present embodiment outputs the segmentation results for the liver, the kidneys, and the gallbladder obtained from the abdominal CT image.

<Training Process> (Functional Configuration and Hardware Configuration) Since a functional configuration and a hardware configuration of the image processing apparatus 500 according to the present embodiment are the same as those of the image processing apparatus 500 according to the first embodiment, descriptions thereof will be omitted.

(Processing Procedure) A processing procedure of the image processing apparatus 500 according to the present embodiment will be described with reference to FIGS. 6A and 6B. Here after, redundant descriptions of portions common to those of the image processing apparatus 500 according to the first embodiment will be omitted.

Step S6100. In this step, the second data acquisition unit 510 acquires a plurality of training data from the storage device 70. The second data acquisition unit 510 then transmits the plurality of training data acquired to the training unit 530.

The CNN 8000 according to the present embodiment includes the multi-class network 8300 having the multi-class output layer 8301. To learn the multi-class network 8300, training data (complete training data) that includes all the ground truth images, which are the ground truth image of the liver, the ground truth image of the kidneys, and the ground truth image of the gallbladder, is needed. This is because, to correctly calculate loss values for a plurality of provisional classification results (a provisional classification result for the liver, a provisional classification result for the kidneys, and a provisional classification result for the gallbladder) output by the multi-class output layer 8301, the corresponding ground truth images are needed. Thus, the second data acquisition unit 510 acquires training data including at least one complete training data.

Step S6200. Since the processing in this step is the same as that in step S6200 in the first embodiment, a description thereof will be omitted.

Step S6300. In this step, the training unit 530 uses a training method described below to learn the CNN received from the second network construction unit 520 by using the plurality of training data received from the second data acquisition unit 510. The training unit 530 then stores the parameters of the CNN after the training in the storage device 70.

The training method will be described in detail with reference to FIG. 6B. Descriptions of steps similar to those in the first embodiment will be omitted, and only differences from the first embodiment will be described.

Step S6310. Since the processing in this step is the same as that in step S6310 in the first embodiment, a description thereof will be omitted.

Step S6320. Since the processing in this step is the same as that in step S6320 in the first embodiment, a description thereof will be omitted.

Step S6330. In this step, the training unit 530 determines the layer whose parameters are to be updated based on the attribute of the training data selected in S6320.

7A is selected in step S6320, in this step, the training unit 530 determines the layers included in all the networks as the layers whose parameters are to be updated. That is, the training unit 530 determines the layers included in the common network 4100, the plurality of single-class networks 4200, and the multi-class network 8300 as the layers whose parameters are to be updated.

If the incomplete training data illustrated in FIGS. 7B to 7D is selected in step S6320, the processing described in step S6330 in the first embodiment is performed. That is, the training unit 530 determines the layers included in the common network 4100 and the single-class network that corresponds to the class whose ground truth image is included in the training data as the layers whose parameters are to be updated.

As described above, in the present embodiment, when the training is performed by using the complete training data, the multi-class network 8300 is learned, and when the training is performed by using the incomplete training data, the multi-class network 8300 is not trained.

Step S6340. In this step, the training unit 530 inputs the training image of the training data selected in step S6320 to the CNN and performs forward propagation. Thus, a provisional classification result (likelihood map) based on the current parameters is obtained.

If the complete training data illustrated in FIG. 7A is selected in step S6320, in this step, the forward propagation is performed on the common network 4100, the plurality of single-class networks 4200, and the multi-class network 8300. Thus, a first provisional classification result for the liver, a first provisional classification result for the kidneys, and a first provisional classification result for the gallbladder are obtained from the respective single-class networks 4200. These are collectively referred to as first provisional classification results. In addition, a second provisional classification result for the liver, a second provisional classification result for the kidneys, a second provisional classification result for the gallbladder, and a provisional classification result for the other region are obtained from the multi-class network 8300. These are collectively referred to as second provisional classification results.

If the incomplete training data illustrated in FIGS. 7B to 7D is selected in step S6320, the processing described in step S6340 in the first embodiment is performed. That is, the training unit 530 obtains a first provisional classification result corresponding to a class whose ground truth image is included or obtains first provisional classification results corresponding to all the classes.

Step S6350. In this step, the training unit 530 calculates a loss value based on the ground truth image of the training data selected in step S6320 and the provisional classification results obtained in step S6340.

If the complete training data illustrated in FIG. 7A is selected in step S6320, the first provisional classification results and the second provisional classification results are obtained in step S6340. Thus, in this step, the training unit 530 calculates a plurality of loss values that correspond to the respective first provisional classification results based on the respective ground truth images in the training data and the respective first provisional classification results. The training unit 530 also calculates loss values that correspond to the second provisional classification results based on the respective ground truth images in the training data and the respective second provisional classification results. The loss value corresponding to the second provisional classification result is calculated by a loss function $L_{multi\text{-}class}$ ($y_{multi\text{-}class}$, $t_{multi\text{-}class}$) based on the ground truth image $t_{multi\text{-}class}=[t_{liver}, t_{kidney}, t_{gallbladder}, t_{others}]$ and the second provisional classification result $y_{multi\text{-}class}=[y_{liver}, y_{kidney}, y_{gallbladder}, y_{others}]$. In this function, $t_{others}$ represents the ground truth image of the other region, and $y_{others}$ represents the provisional classification result for the other region. The plurality of loss values corresponding to the respective first provisional classification results are calculated as described in step S6350 in the first embodiment.

If the incomplete training data illustrated in FIGS. 7B to 7D is selected in step S6320, the processing described in step S6350 in the first embodiment is performed. That is, the training unit 530 calculates a loss value corresponding to the first provisional classification result obtained in step S6340.

As the loss function, a known loss function can be used. In addition, to calculate the loss value for each of the first provisional classification result and the second provisional classification result, the same loss function may be used, or different loss functions may be used. In addition, a weight may be applied to each of the loss values. The loss function that can provide good training results may be different for training the CNN only having the single-class output layers and for training the CNN only having the multi-class output layer. For example, MSE can provide the best training results for the CNN only having the single-class output layers, whereas cross entropy can provide the best training results for the CNN only having the multi-class output layer. A similar phenomenon can occur in the CNN according to the present embodiment. Thus, the loss value for the first provisional classification result is calculated by using the MSE, and the loss value for the second provisional classification result is calculated by using the cross entropy. In this way, an improvement in classification accuracy for the both can be expected.

Step S6360. In this step, the training unit 530 updates parameters based on the information about the layers whose parameters are determined to be updated in step S6330 and the loss values corresponding to the respective provisional results calculated in step S6350.

If the complete training data illustrated in FIG. 7A is selected in step S6320, a plurality of loss values for the respective first provisional classification results and a loss value for the second provisional classification result are obtained in step S6350. Thus, in this step, the training unit 530 updates parameters based on the corresponding loss values by using a known method such as backpropagation. The loss value for the second provisional classification result is the loss value for the output of the multi-class network 8300. Thus, the training unit 530 calculates a gradient of the loss value for the second provisional classification result by performing backpropagation starting from the multi-class output layer 8301 provided at the end of the multi-class network 8300. Likewise, the training unit 530 calculates a gradient of the plurality of loss values corresponding to the first provisional classification results by performing backpropagation starting from the single-class output layers provided at the respective ends of the plurality of single-class networks 4200. When performing this backpropagation, since the multi-class network 8300 is connected to each of the single-class networks 4200, the training unit 530 uses the value back-propagated through the multi-class network 8300 and calculates the gradient. Likewise, in the common network 4100, the training unit 530 performs backpropagation by using the values back-propagated through the respective single-class networks 4200 and calculates the gradient. The training unit 530 then updates the parameters of the layer whose parameters are determined to be updated in step S6330 based on the gradient.

If the incomplete training data illustrated in FIGS. 7B to 7D is selected in step S6320, the processing described in step S6360 in the first embodiment is performed.

Step S6370. Since the processing in this step is the same as that in step S6370 in the first embodiment, a description thereof will be omitted.

In accordance with the above procedure, the image processing apparatus 500 according to the present embodiment generates the parameters of the CNN of the image processing apparatus 100.

<Advantageous Effects of the Present Embodiment> As described above, the CNN of the image processing apparatus 100 and the image processing apparatus 500 according to the present embodiment can learn by using the training data that does not include at least one of the ground truth images, which are the ground truth image of the liver, the ground truth image of the kidneys, and the ground truth image of the gallbladder. That is, this CNN can utilize training data for training even when the training data includes missing ground truth data corresponding to at least one of the classes each of which represents a corresponding one of the plurality of target object.

Third Embodiment

The invention disclosed in the present description is not limited to the segmentation. For example, the present invention is applicable to object recognition and object detection. Object recognition is a task of classifying a target object drawn in an image into a class (a category). Object detection is a task of classifying a position (or a position and a class) of a target object drawn in an image.

Figure 9:
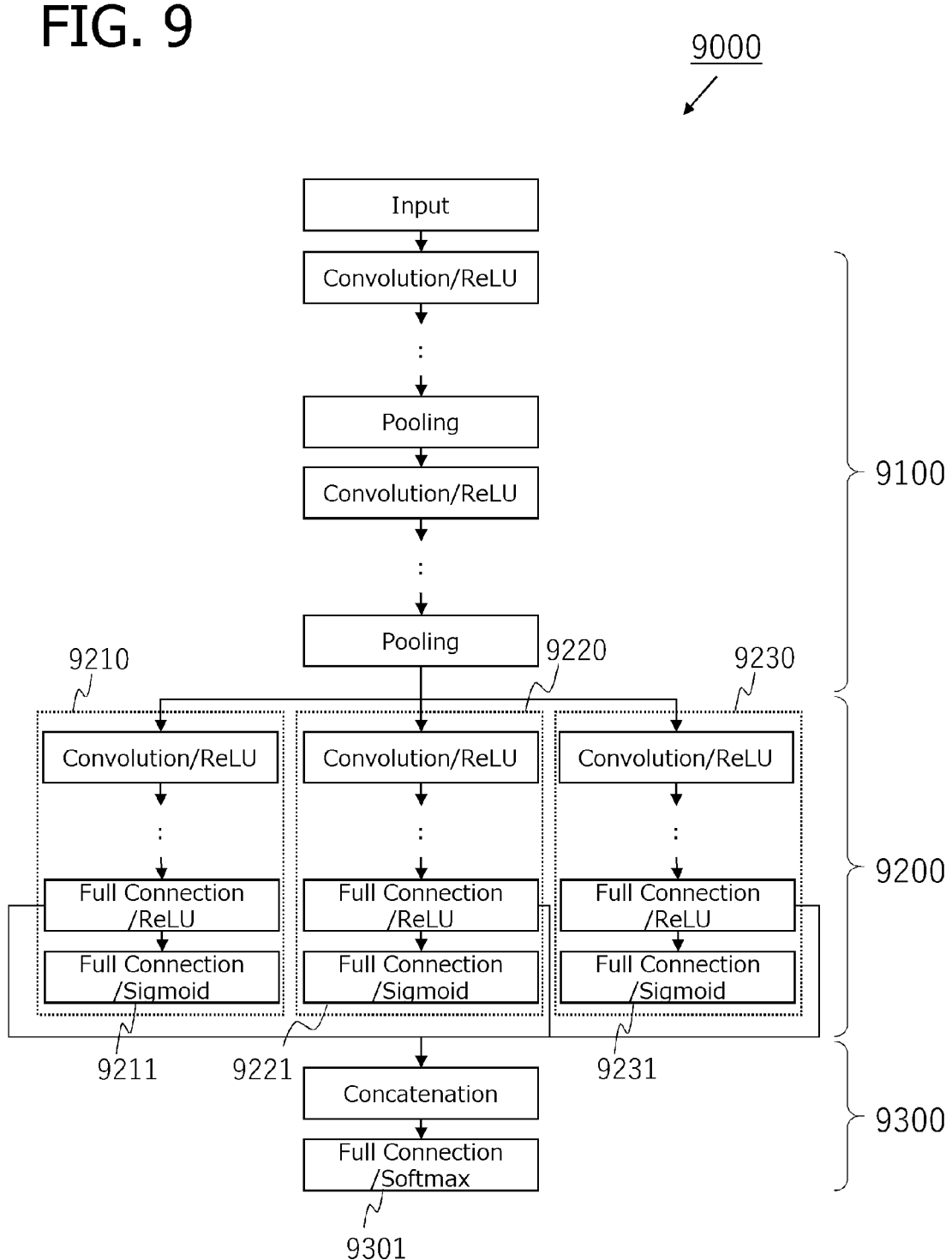
FIG. 9 illustrates a configuration of a CNN according to a third embodiment.

FIG. 9 illustrates an example of a CNN 9000 for performing object recognition. The illustrated CNN 9000 includes a common network 9100, a plurality of single-class networks 9200, and a multi-class network 9300. This CNN 9000 includes a full connection layer that connects all neurons between layers, and an activation function is applied to an output result of the full connection layer. A single-class output layer is provided at each end of the plurality of single-class networks 9200. The single-class output layer is a full connection layer in which a sigmoid function is set as an activation function. A multi-class output layer 9301 is provided at the end of the multi-class network 9300. The multi-class output layer is a full connection layer in which a softmax function is set as an activation function. This CNN can utilize incomplete training data for training by including the single-class output layer provided at each end of the single-class networks 9200 and thus achieves the advantageous effects disclosed in the present description.

In addition, there are no restrictions on the processing target data in the invention disclosed in the present description. While the above descriptions have been made using the CT image captured by the X-ray CT apparatus as an example, other medical images captured by a nuclear magnetic resonance imaging (MRI) apparatus, an ultrasonic imaging apparatus, or the like, can also be processed. In addition, an image captured by a camera, three-dimensional data obtained by a depth sensor, an audio signal, text data, etc., can be processed. The invention disclosed in the present description is applicable to any other data.

<Other Embodiments> Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one processor; and
   at least one memory storing instructions that, when executed by the processor, cause the processor to function as:
      an acquisition unit configured to acquire an image; and
      a classification unit configured to perform inference on the image by using a neural network and to output a classification result, wherein the neural network includes:
         a common network that is common to a plurality of classes and is configured to extract a first feature from an input image;
         a plurality of single-class networks, each of which corresponds to a corresponding one of the plurality of classes and is configured to extract each of a plurality of second features based on the first feature, wherein each of the plurality of single-class networks is a trained network based on a loss value for an output of a single class output layer that classifies the corresponding class; and
         a multi-class network configured to extract a third feature, based on at least one of the first feature and the second feature, the multi-class network having a multi-class output layer configured to classify at least two of the plurality of classes.

2. The image processing apparatus according to claim 1, wherein the common network is common to all of the plurality of classes.

3. The image processing apparatus according to claim 1, wherein the common network is common to a part of and at least two of the plurality of classes.

4. The image processing apparatus according to claim 1, wherein the common network includes a first common network that is common to a first class and a second class, and a second common network that is common to the first class and a third class, and
   wherein the first common network and the second common network are connected to a single-class network corresponding to the first class.

5. The image processing apparatus according to claim 1, wherein the classification unit is configured to input the image to the neural network, to obtain a first classification result based on the second feature from each of the plurality of single-class networks, to obtain a second classification result based on the third feature from the multi-class network, and to generate a third classification result for at least one of the plurality of classes by integrating correspondingly to the class the first classification result and the second classification result.

6. The image processing apparatus according to claim 5, wherein the classification unit generates the third classification result from the first classification result and the second classification result, by performing weighted average value integration, maximum value integration, minimum value integration, logical product integration, or logical sum integration on the first classification result and the second classification result.

7. The image processing apparatus according to claim 1, wherein the common network a trained network is based on a gradient calculated by at least one of the plurality of single-class networks.

8. The image processing apparatus according to claim 1, wherein each of the plurality of single-class networks has the single-class output layer that classifies the corresponding class.

9. An image processing method comprising:
   providing at least one processor and at least one memory storing instructions that, when executed by the processor, cause the processor to perform:
      an acquisition step of acquiring an image; and
      an inference step performing inference on the image by using a neural network to output a classification result, wherein the neural network includes:
         a common network that is common to a plurality of classes and configured to extract a first feature from an input image;
         a plurality of single-class networks, each of which corresponds to a corresponding one of the plurality of classes and is configured to extract each of a plurality of second features based on the first feature, wherein each of the plurality of single-class networks is a trained network based on a loss value for an output of a single class output layer that classifies the corresponding class; and
         a multi-class network configured to extract a third feature, based on at least one of the first feature and the second feature, the multi-class network having a multi-class output layer configured to classify at least two of the plurality of classes.

* * * * *